US009665835B2

(12) United States Patent
Sa et al.

(10) Patent No.: US 9,665,835 B2
(45) Date of Patent: May 30, 2017

(54) SOCIAL DISTRIBUTION OF EMERGENCY STATUS

(75) Inventors: Brian Paihan Sa, Irvine, CA (US); William Chen, Palo Alto, CA (US); Taro Kodama, Tokyo (JP)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/400,012

(22) Filed: Feb. 17, 2012

(65) Prior Publication Data

US 2013/0218959 A1   Aug. 22, 2013

(51) Int. Cl.
  *G06F 15/16*   (2006.01)
  *H04M 11/04*   (2006.01)
  *G06Q 10/00*   (2012.01)
  *G08B 27/00*   (2006.01)
  *G06Q 10/10*   (2012.01)

(52) U.S. Cl.
  CPC .............. *G06Q 10/00* (2013.01); *G06Q 10/10* (2013.01); *G08B 27/005* (2013.01)

(58) Field of Classification Search
  CPC ........ G06Q 10/10; G06Q 50/22; G06Q 50/24; G06Q 40/08; H04L 29/06; H04L 29/08072; H04L 29/06027; H04L 12/581; H04M 2242/04; H04M 11/04; H04M 3/5116; H04M 7/006; H04Q 2213/1337; G06F 19/322

USPC .......................................................... 709/204
See application file for complete search history.

(56) References Cited

U.S. PATENT DOCUMENTS

| | | | |
|---|---|---|---|
| 2007/0072583 A1* | 3/2007 | Barbeau ............ | H04M 3/42348 455/404.2 |
| 2011/0058659 A1* | 3/2011 | Merlino .............. | H04L 12/1895 379/45 |
| 2012/0066139 A1* | 3/2012 | Guzman ................ | G06Q 50/01 705/319 |
| 2012/0123806 A1* | 5/2012 | Schumann, Jr. . | G08G 1/096775 705/4 |
| 2012/0130753 A1* | 5/2012 | Lewis ..................... | G01S 19/17 705/4 |
| 2012/0158454 A1* | 6/2012 | Saunders ........... | G06Q 10/0635 705/7.28 |
| 2012/0158845 A1* | 6/2012 | Baalu ..................... | G06Q 30/02 709/204 |
| 2013/0007788 A1* | 1/2013 | Levinson ................. | H04N 7/18 725/13 |

* cited by examiner

*Primary Examiner* — Mahran Abu Roumi
(74) *Attorney, Agent, or Firm* — Fenwick & West LLP

(57) ABSTRACT

A social networking system distributes information related to emergency events. The social networking system provides an interface for users to view information about the users' connections related to the emergency event. The interface allows users to filter the users' connections to search for connections affected by the emergency event. The interface also includes a status indicator for the users and provides a method for providing input to the connections' status.

25 Claims, 4 Drawing Sheets

SOCIAL DISTRIBUTION OF EMERGENCY STATUS

BACKGROUND

This invention relates generally to social networking, and in particular to sharing the status of an individual in relation to an emergency.

Emergencies have the potential to affect a large number of people. Emergency responses can be taxing on infrastructures, supplies, and the social fabric. While emergency response crews are responding with food, water, and other necessities, individuals in the emergency area attempt to communicate with their friends and loved ones to find out if they are okay. This communication can be crucial not only to relieve loved ones of worry, but also to relay if an individual needs help or is no longer is danger.

Typical methods of communicating with to loved ones include individualized messages, such as by phone, or direct message from a mobile device. However, these individualized messages are expensive to the messaging infrastructure as they originate from or are directed to the emergency area, which may repeat for each of the individual's contacts and can often cause messaging channels to overload. An individual could notify others through use of a social network to propagate the individual's status. However, existing social networks do not have any means of providing a centralized area to communicate disaster information or to surface disaster information via a stream or notification to help ensure that a user's information relating to the disaster is noticed. Such information can be lost in other news events related to other users.

SUMMARY

A social networking system emergency interface is provided for enabling users to communicate information to one another regarding status of the users relative to an emergency. In an embodiment, an emergency event node in the social network is created representing the emergency, and users are identified as being at-risk relative to the emergency automatically, by user-initiated actions, or by identification from a list provided by a trusted authority. Users search for connections affected by the emergency and can view an interface about the connections of the user related to the emergency. The users can share information about a connection's status with one another and initiate conversations about other users relating to the status. The shared information and conversations are used to identify users who are associated with the emergency event node.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
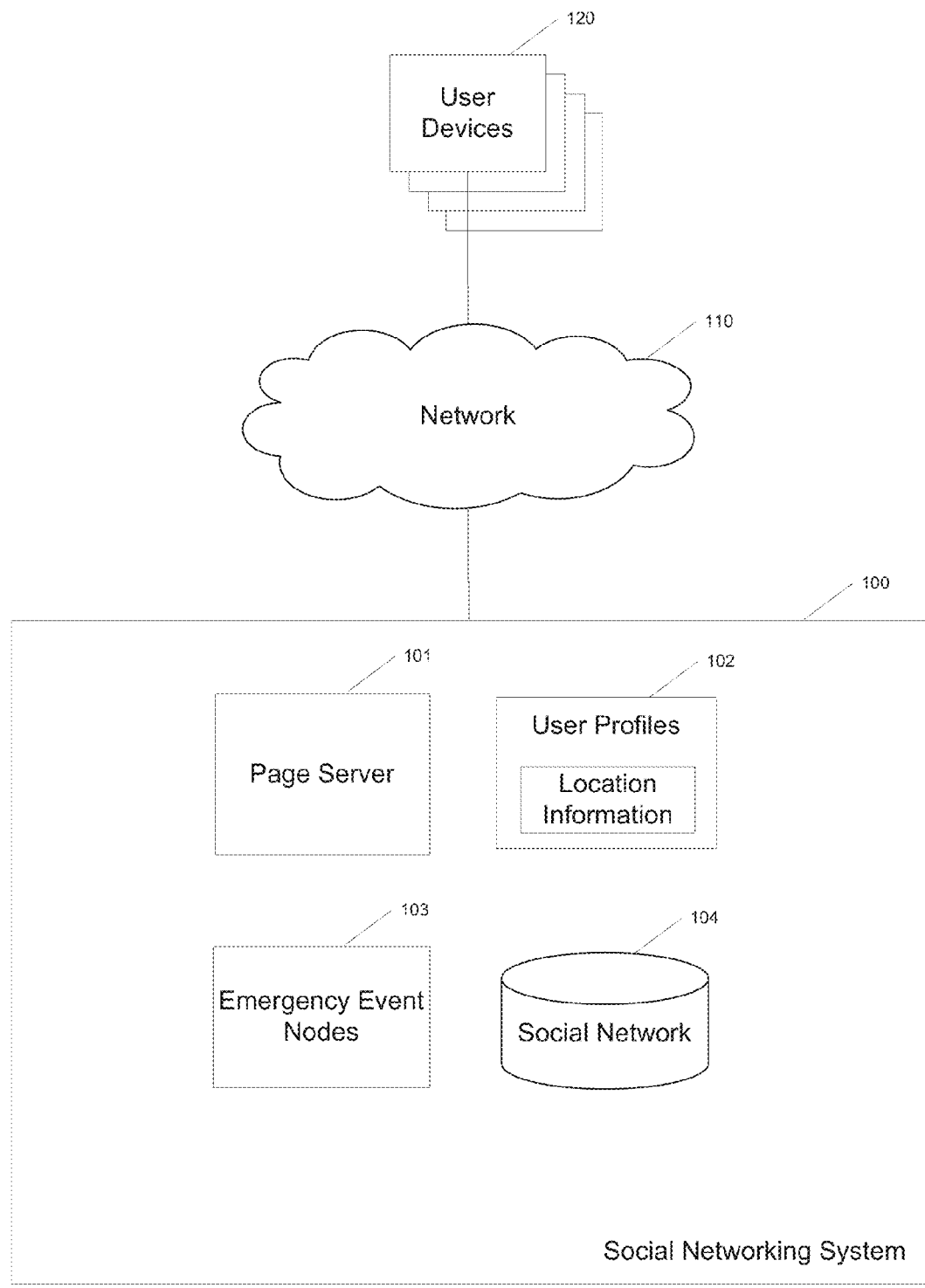
FIG. 1 is a system overview of a social networking system according to an embodiment.

FIG. 1 is a system overview of a social networking system according to an embodiment. A social networking system 100 communicates with a variety of user devices 120 across a network 110. The social networking system 100 includes user profiles 102, which can include location information about the users. The user profiles 102 include information about users, such as the user's interests, user biographies and demographic information, user names, and other information about users. Users can also provide content to the social networking system, such as photos, status messages, news events, and other items. These items may be stored within the user profiles 102, or may be stored in separate nodes in the social networking system connected to the user profiles 102. The social network 104 provides the connection information between the various users and the various nodes in the social network. This social network 104 provides, for example, information about users' relationship to other users and to other social networking entities such as interests, companies, and others.

The social networking system 100 includes a page server 101 to provide content to user devices 120. The provided content includes web pages associated with user profiles 102, and can also include media, such as photos, videos, music, and social networking information. The provide content can also include information about relationships between users and other social networking information. The page server 101 is the interface through which the user devices 120 interact with the social networking system 100. Though described as a "page server," the page server 101 may provide content to users via methods other than web pages. Content can be provided in a variety of ways compatible with the user devices 120. For example the user devices 120 may connect to the social networking system 100 using an application on a mobile device, or using an html browser on a stand-alone desktop or by other means. In addition, the user devices may interact with the social networking system 100 through widgets or components on third party servers (not shown).

The social networking system 100 also includes emergency event nodes 103. The emergency event nodes 103 provide nodes in the social networking system to associate users to emergency events. Emergency events can represent any type of emergency, crisis, disaster, or other event for which users may wish to timely communicate their safety. For example, an emergency event node could represent a natural disaster such as a tsunami or hurricane, or a man-made crisis such as a plane crash, or cruise ship running aground.

The emergency event nodes 103 are associated with users who may be imperiled or affected by the emergency or who have been indicated by themselves or others to be affected by the emergency. The social networking system 100 allows users to distribute status information about the users associated with the emergency event nodes 103. The users distributing status information can be the associated user or the associated user's connections. Connections can indicate status information about a user associated with an emergency such as marking the user safe, or starting a conversation thread about the user's status.

Users can be associated with emergency event nodes 103 by a variety of ways. For example, many emergency event nodes 103 are associated with a specific location. This location is correlated with location information known about users to determine which users are located in the area of the emergency event nodes 103 and may therefore be at-risk. The geological location and temporal scale can also be adjusted according to the impact of the emergency. For example, some emergency events are located at a specific storefront, such as a hold-up, while other events impact an entire city or region like a flood, earthquake, or power outage. User location information can assist in identifying whether the user is at-risk by the event by using the granularity of the user location in conjunction with the granularity of the event. For example, a bank hold-up emergency likely affects users who are specifically associated with the bank, such as users who work at the bank or users who notified the social networking system 100 that the user is at the bank, such as by checking-in to the location, indicating an intent to attend an event at a location, or identifying the location from a user device in the social networking system 100. User locations may also be derived using implicit location information, such as by the accessing IP address of the last user login. User locations may be derived from the user's profile information, such as a city in which the user lives or works. After determining that a user may be at-risk, the user and the user's connection may be invited to determine whether the user should be associated with that emergency event node 103. In addition, the social network may determine at-risk users by using an external list from a third party. For example, when an emergency on a ship or plane is declared, the passenger manifest may be provided to the social network, which can identify members of the social networking community who are at-risk using the names and other details of the manifest and correlating these names with identifying information in the social network, such as the name of a user on the social network. After identifying the users who may be at-risk, user input is used to determine which users to associate with the emergency event nodes 103.

As a use case, when an emergency occurs in a particular area, and the user's last check-in is within the emergency area, the user is determined to be potentially affected by the emergency (at-risk). A message is send to the at-risk user to determine whether the at-risk user is in fact affected by the emergency event. If the user affirms, then the user is associated with the emergency event node 103. In other embodiments, in addition to the user, connections of the user who are able to view the reason the user is potentially impacted by the emergency are also able to confirm that the user is in fact affected, in which case the user is associated with the emergency event 103.

Whether a user or the user's connections view information indicating the user is at-risk is impacted by the emergency is affected by privacy settings. For example, if the privacy settings on the user's check-in allow only two connections to view that check-in, then only those two connections (in addition to the user himself) may view information associating the user to the emergency or to indicate the user is associated with the emergency event node 103.

Further, individual connections may specifically indicate to the social networking system 100 that a user is at-risk or should be associated with the emergency event node 103. For example a user may have planned a trip to an area where an emergency was later declared, but the trip may not have been reported to the social networking system 100. A connection who is aware of the trip may indicate to the system that the user is at-risk by the emergency. In all such interactions, the user's privacy settings and preferences are observed by the system.

Though described here as emergency event nodes 104, emergencies may be represented in a social networking system in a variety of ways. The emergency event node 104 is described in this disclosure but any mechanism to provide a convenient method of associating users with an emergency event and providing a method for sharing information about the associated users vis-à-vis an emergency could be used.

Emergency Response Interface

Figure 2:
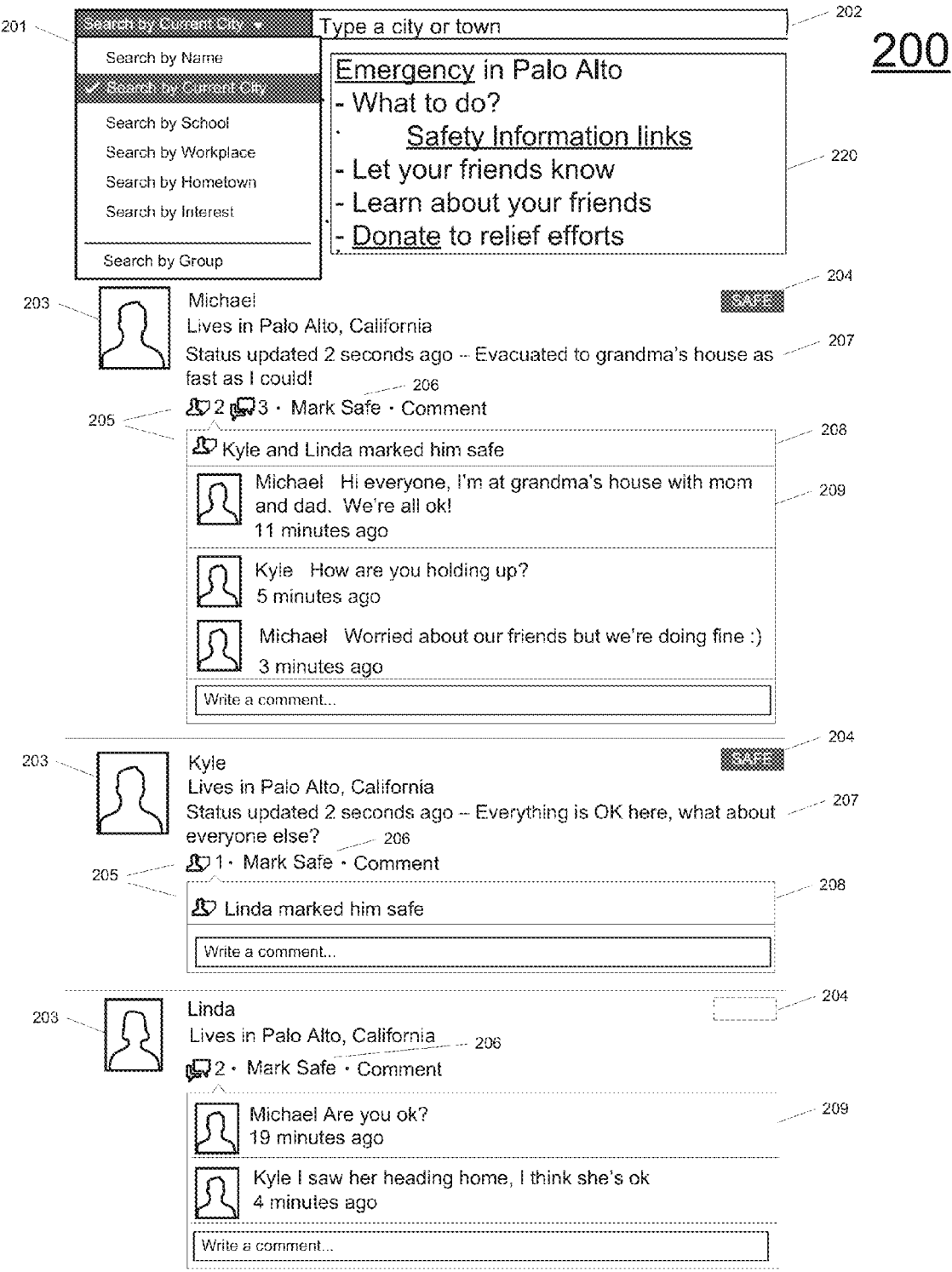
FIG. 2 shows an emergency response interface according to an embodiment.

FIG. 2 shows an emergency response interface 200 according to an embodiment. The emergency response interface 200 may be accessed by a user by navigating to a portion of the social networking system 100 associated with the emergency event nodes 104. The emergency response interface 200 provides an interface for viewing information related to an emergency. In addition, connections can contribute information that the connection knows about the status of users associated with the emergency, which information can be dispersed to the other connections of the user. The contributed information can be passed to an information channel related to the user, such as a newsfeed, highlight feed, status feed, user profile, or user timeline. The appearance of the contributed information for a particular viewing user is subject to privacy settings of the user and the contributing user. The contributed information can also be maintained on the emergency response interface 200 or associated with an emergency event node 103.

The emergency response interface 200 includes a search method 201 for identifying connections of a user in relation to the emergency event. For example, the user can filter a search according to a variety of means, such as by name, current city, school, workplace, hometown, interest, or a group. A group can comprise users who are not necessarily connections or friends of one another, for example a tour group, or a school classroom. The search parameters can be modified by a search box 202. The results of the search are the users' connections who fulfill the filter and search parameters. This listing can be sorted according to the likelihood someone is at-risk using the information known by the system and can be further personalized according to the information accessible by the viewing user. For example, if a search is conducted by "workplace" for an emergency located in New York, the results would list employees based in the New York campus of the workplace as more likely to be at-risk than the California campus and therefore appear first in the list. However, if the system has information that someone from the California campus is visiting the New York campus, the system may also treat that person as at-risk and place this person higher in the sorted result. In the absence of a search method 201 or as a default, the system in one embodiment searches for connections according to the affinity of the connection to the user. For example, connections can be filtered using a variety of explicit factors, such as whether the user is already associated with the emergency event node, whether a user has been marked safe with respect to the emergency, whether there are any comments relating to that user and the emergency, and the user's stated location. In addition, implicit factors can be used, such as implicit location signals (derived e.g. from a user's IP address), whether a user has been searched for by another user, and the strength of the connection between the users. In addition, the search method 201 can search for connections who have not been associated with the emergency event node, but are sorted by the level of risk identified by the system.

The connections displayed by the filtering are also affected by privacy settings. A connection who is considered at-risk for an emergency event may not be viewable by the user if the view does not have access privileges to any information indicating the connection would be at-risk relating to the emergency. For example, a connection who has checked-in to a location, but manages privacy to the check-in to prevent access by the user to the check-in. When an emergency occurs related to the location affecting the check-in location, the connection may be marked by the system as likely at-risk by the emergency. The user is not be permitted to see the connection as likely at-risk with the emergency event, because the user cannot view the information (the check-in) which caused the association. As a result, the connection does not appear in filter results which would otherwise include the connection.

In addition to searching, an emergency information box 220 is included in the emergency response interface 200 to provide information to users about responding to the emergency. The emergency information box 220 can include, for example, links to resources for responding to the emergency, links to resources to donate time or services to the relief effort, and instructions to teach the user about the social networking interface 200 for the emergency. Other information related to the emergency and responses to be taken by the user can also be provided in various embodiments.

Using the search results, several connections 203 of the user are displayed. In this example interface, connections 203 Michael, Kyle, and Linda are displayed. The connections are displayed in individual sections in this embodiment, and include a picture associated with the user. Each connection 203 also has a status indicator 204. The status indicator 204 indicates whether the connection's status is known by the social networking system, as reported by the connection 203 or one of the connection's 203 connections. For example, the status indicator 204 indicates the connection 203 is "safe" for Michael and Kyle. Where there is no confirmed status for a connection 203, such as shown for Linda, the status of the connection 203 has not yet been reported by the user or the user's connections. The status indicator 204 may be blank, or the status indicator 204 may be an invitation for the user to determine the connection 203's status and share information that the user knows. The status indicator 204 may also be reflected in a more detailed status indicator 205, indicating the number of people who have indicated the connection is safe. In one embodiment, if the connection 203 has privacy settings preventing the viewing user from accessing the information that would have indicated the connection 203 was at-risk, the connection 203 is not be shown at all. Alternatively, the connection 203 is shown because the connection 203 matches the filter, but the connection 203's ranking or at-risk probability is adjusted according to the information viewable by the viewing user, which may place the connection 203 further down on the sorted results list.

The specific individuals marking the connection safe can also be shown. The individuals shown to the user as marking a connection 203 safe is controlled in one embodiment according to privacy settings by each user. For example, if an individual has indicated a privacy setting that the user may not see any posts from that individual, that individual's remarks on a connection 203's safety is not shown in the detailed status indicator 205, but may be shown in the status indicator 204 depending on the embodiment. For example, if a user marking the connection 203 as safe has indicated a privacy setting that the viewing user cannot see his actions, the identity of the user marking the connection 203 safe will not be shown in the detailed status indicator 205 but may be shown in the status indicator 204 depending on the embodiment. A mark safe 206 option is also included to allow the user to mark the connection 203 safe. When marking a user safe using mark safe 206, the user in one embodiment is also provided privacy settings to control the distribution of that information.

The connection's 203 most recent status update 207 can also be included in the emergency response interface 200. The status update 207 can be the most recent update provided to the connection's 203 general profile page, or can be a status update provided directly to the emergency event interface 200 or emergency event node 103. The most recent status update 207 can also be affected by the viewing user's access to the connection's 203 status updates. For example the connection 203 may have provided a first more-recent status update with a privacy setting preventing the viewing user access to the first update, in which case the viewing user is shown a second update or no update at all. Though the emergency event interface 200 in this figure depicts the connections 203 of the user, the interface 200 may also provide an option to update one's own status relative to the emergency.

Each connection 203 may also have a comment section 209. The comment section 209 can be used to discuss a connection 203 relative to the emergency. For example, the user may request information about the connection's 203 status or provide information known about the connection's 203 status to the system. Using this interface related to the emergency event, a forum is thus provided for users of the social networking system 100 to communicate information about one another and propagate safety information. In addition, connections who are known to be associated with an emergency event and who have not been marked with a safe status indicator 204 can be easily identified for users or an operator of the social networking system 100 as potentially requiring assistance.

In addition to positively indicating that the user is "safe," the status indicator 204 and other objects above are also used in one embodiment to indicate that the user is not safe or in need of help. For example, the user may indicate that a connection 203 or the user is trapped in a location or in need of assistance. A conversation can be started in comments 209 to share the needs of the individual. For example a user may be isolated but able to use a mobile device to broadcast the user's status using the social networking system 100 in search of help.

Emergency Response Processing

Figure 3:
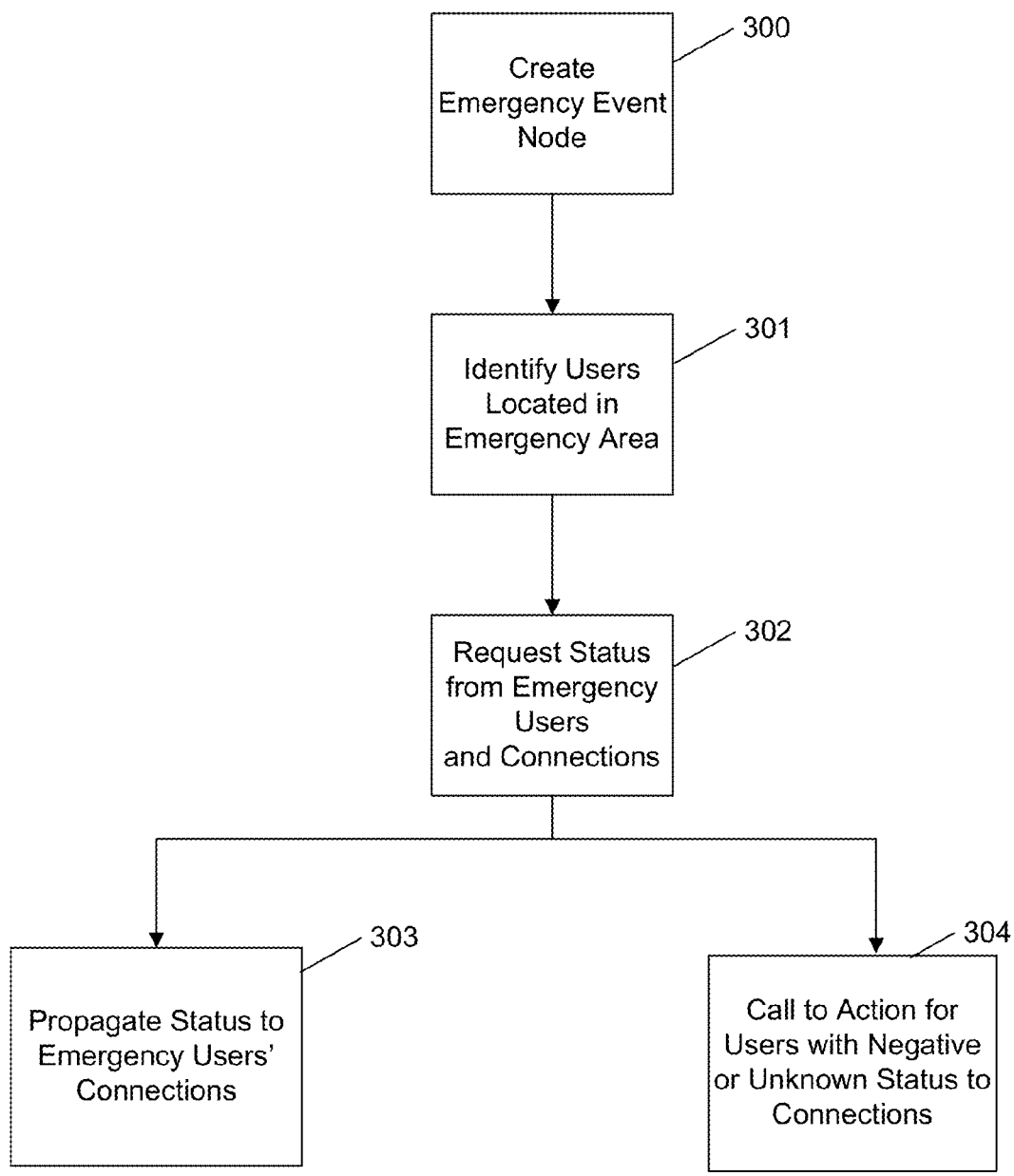
FIG. 3 is a flowchart for a process of managing emergency responses within a social networking system according to an embodiment.

FIG. 3 provides a flowchart for a process of managing emergency responses within a social networking system according to an embodiment. An emergency event node is created 300 by the system responsive to an emergency. The emergency event node can be indicated by a system operator of the social networking system 100. Alternatively, other entities in the social networking system may be granted permissions to generate emergency event nodes. These entities vary according to implementations and can include authorities such as police, government executives, news agencies, or other trusted entities. In addition, the social networking system in one embodiment monitors news articles or other recent events to identify when an emergency event occurs. After detecting the emergency, the emergency may be verified by a system operator, or the emergency event node may be created with an option for users to confirm the automatically detected emergency represents a genuine emergency event.

Using the emergency information and information about the user location, the system next identifies 301 users located in the emergency area. These users are associated with the emergency event nodes as described above, and may appear in an emergency event interface 200.

Next, the system requests status 302 from the users associated with the emergency area and the connections to those users and depending on privacy settings includes other users of the social network (e.g. connections of connections). For example, the request may be pushed upon next login, may be a pop-up on another page in the social networking system, may be a notification in a mobile device application, or may be an email. The notification method may be adjusted according to the urgency of the emergency. For example, some emergencies are not urgently time-sensitive, and for these emergencies the system may request information when the user or a connection of the user next logs in. Other emergencies are more urgent and yield several of these methods pushed to users at once. In addition, when a connection has notified the system that the associated user is safe, the system may withdraw more intrusive notifications to other users where possible.

Upon receipt of information about a user associated with the emergency, the system propagates 303 the status of the user to the user's connections. The propagation can be performed by providing the information on a page related to the emergency event, such as the emergency event node, or the propagation can be distributed by inserting the status information into a communications channel such as a newsfeed, a highlight feed, the user's profile, or the user's timeline. The information may further be propagated to any other users who are subscribed to user.

If no information is received about a user within a period of time, the system in one embodiment initiates a call to action 304. The call to action can include placing the user on a list of missing or affected persons by the emergency, contacting authorities associated with the emergency, or reiterating the need for information to the user's connections. In addition, the call to action may initiate a push notification to the user or the user's close connections requesting a status update for the user. For example, the push notification can include a text message to an associated phone number, a notification to an application on a mobile device, or a pop-up message when logging into the social network.

Figure 4:
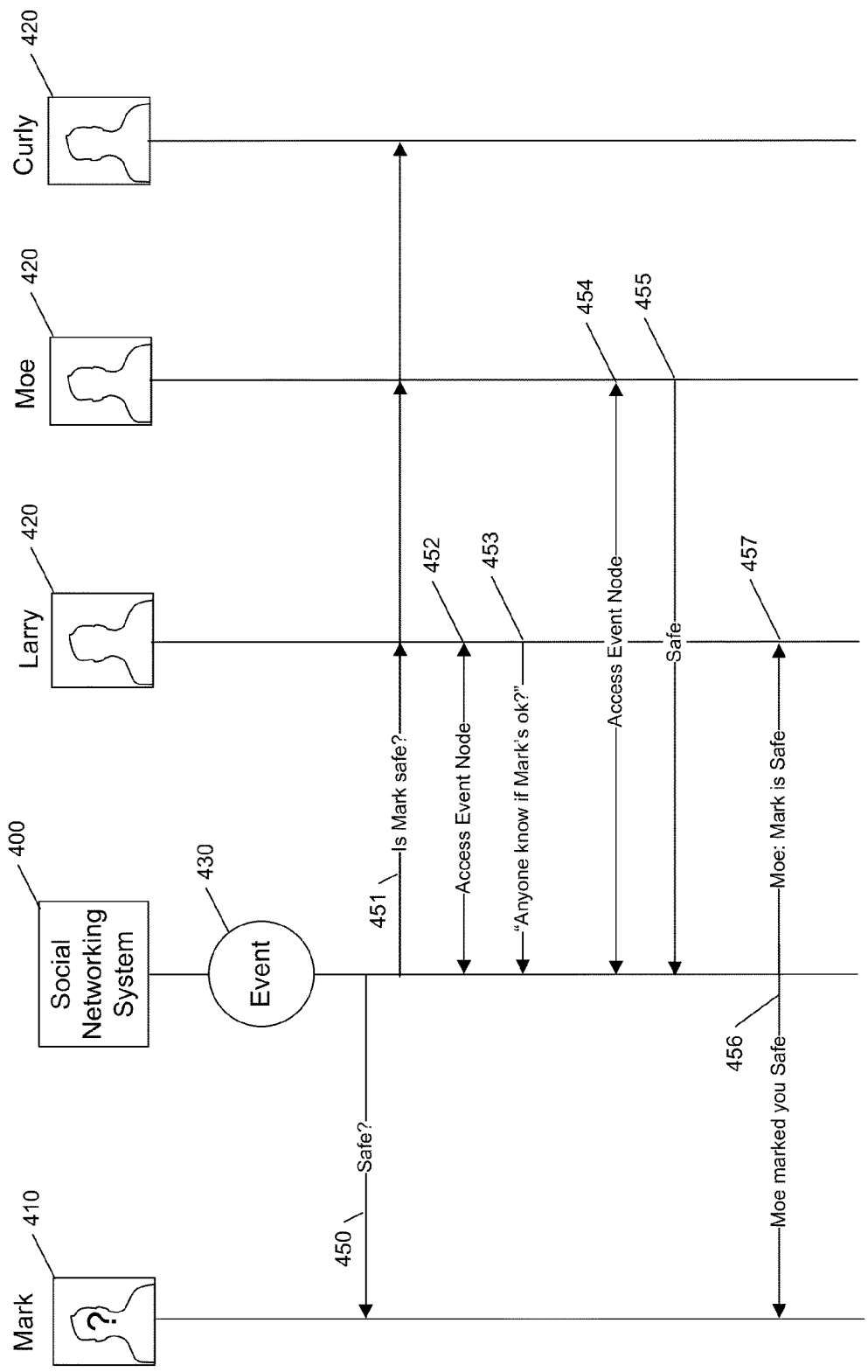
FIG. 4 is an interaction diagram between users and a social networking system according to one embodiment.

FIG. 4 illustrates an interaction diagram between users and a social networking system according to one embodiment. The social networking system 400 receives an event 430 that indicates an area or list of affected users. The social networking system indicates user 410 Mark may be affected by the emergency event 430. Connections 420 are Mark's 410 connections who may be concerned for his welfare as a result of the event 430.

After the event 430, the social networking system 400 provides a request 450 to Mark 410 requesting an update to his status relative to the event 430. The system may delay to see if Mark 410 responds, or may simultaneously request 451 an update to Mark's 410 connections 420. As discussed above, the requests 450 and 451 may be communicated to the user 410 and connections 420 in a variety of ways, such as by providing a indicator on another section of the social networking system, adding the indicator to a feed, using a mobile phone notification, or other notification to the users.

In this example, User 420 Larry accesses 452 the emergency event node and receives an interface to view information about the emergency, such as the interface shown in FIG. 2. User 420 Larry provides a message 453 to the social networking system 400 through the interface starting a conversation about the user associated with the event 410. In addition, the message can subscribe Larry 420 to further events related to Mark 410 and the event 430. By being subscribed to Mark's events, Larry 420 will be automatically updated using a news item, highlight, or other notification of updates to Mark's 410 status after Larry 420 has provided information.

Next, in this example, connection 420 Moe requests access 454 to the event node 400. Moe 420 indicates to the social networking system 400 and the event node 430 an update to Mark's 410 status by marking Mark safe 455. The status indication is provided 456 to the user associated with the emergency event 410 Mark, and can be provided 457 to any user subscribed to the event or the user, in this case Larry 420.

Variations

Though described above primarily in relation to physical emergencies, any event causing a need for communication of status among affected persons to the affected persons' connections can be used. For example, an emergency may occur virtually, such as an outage of an important internet service which may cause a disruption in the affected persons' lives. The users affected by the outage may be identified, for example, by the users' relationship within the social network relative to the internet service. For example the internet service may maintain a page within the social networking service which users connect to, become fans of, or "like" within the social networking service. These users who connect to the service may be presumed to be affected by the outage and may need to communicate information about the outage to their social network.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   establishing an emergency event node for an emergency in a social networking system;
   accessing records for a plurality of users of the social networking system, wherein each user of the plurality of users is associated with a set of connections to other users in the social networking system;
   determining a set of at-risk users from the plurality of users as being associated with the emergency event node, the set of at-risk users identifying users that may be impacted by the emergency;
   requesting a status update relative to the emergency event node from one or more users connected to at least one at-risk user in the set of at-risk users;
   receiving, from a user connected to an at-risk user in the set of at-risk users, one or more status updates about one or more at-risk users, the status update including a safety indicator chosen from a set of predetermined safety indicators; and
   communicating the status updates, including the safety indicator, about the at-risk user to one or more other users who have established a connection with the at-risk user, the communicating excluding communication of the status updates to one or more users who do not have access privileges to information associating the one or more at-risk users with the emergency event node.

2. The computer-implemented method of claim 1, wherein the requesting includes requesting a status for the at least one at-risk user from another user who has established a connection to the at least one at-risk user in the social networking system.

3. The computer-implemented method of claim 1, wherein the communicating comprises distributing the status update in a newsfeed feed.

4. The computer-implemented method of claim 1, wherein the communicating comprises distributing the status update using a push notification.

5. The computer-implemented method of claim 1, wherein the request to establish the emergency event node includes a geographic area, and wherein the determining comprises comparing the geographic area of the emergency event with location information associated with the at-risk users.

6. The computer-implemented method of claim 5, wherein the location information for at least one user of the plurality of users comprises a check-in of the at least one user.

7. The computer-implemented method of claim 5, wherein the location information for at least one user of the plurality of users comprises profile information of the at least one user.

8. The computer-implemented method of claim 5, wherein the location information for at least one user of the plurality of users comprises an intent to attend an event at a location.

9. The computer-implemented method of claim 5, wherein the location information for at least one user of the plurality of users comprises user profile information.

10. The computer-implemented method of claim 5, wherein the location information for at least one user of the plurality of users comprises a location identified from a user device.

11. The computer-implemented method of claim 1, further comprising:
    receiving a request to establish the emergency event node, the request comprising a list of persons associated with the emergency,
    wherein determining the set of at-risk users comprises comparing the list of persons with identifying information associated with the plurality of users of the social networking system.

12. A computer-implemented method comprising:
    establishing an emergency event node in a social networking system;
    identifying a set of at-risk users relative to the emergency event node;
    associating a status with each of the users in the set of at-risk users who are associated with the emergency event node, the status including a safety indicator chosen from a set of predetermined safety indicators;
    providing an interface to a viewing user of the social networking system to view information associated with the emergency event node in the social networking system;
    excluding a connection from a plurality of viewing user's connections if the viewing user does not have access privileges to information associating the connection with the emergency event node;
    filtering the plurality of the viewing user's connections;
    sorting the filtered connections, the sorting based in part on the filtered connections' membership in the set of at-risk users; and
    sending, for display to the viewing user, information about at least a portion of the sorted users, the information including the status of the sorted users, wherein the information sent for display to the viewing user includes an interaction element to provide a selection of a safety indicator from the set of predetermined safety indicators.

13. The computer-implemented method of claim 12, where the identification of the set of at-risk users is based at least in part on private information associated with the plurality of users, and wherein the sorting reduces the sorted position of at-risk users whose private information is not accessible by the viewing user.

14. The computer-implemented method of claim 12, where the filtering is responsive to an input received from the viewing user into a search interface.

15. The computer-implemented method of claim 12, where the filtering is user-selectable.

16. The computer-implemented method of claim 12, wherein the filtering is based on location information associated with the plurality of users.

17. The computer-implemented method of claim 12, wherein the filtering is based on the safety indicator of the plurality of users associated with the emergency event node.

18. The computer-implemented method of claim 12, wherein the filtering is based on membership in a group.

19. The computer-implemented method of claim 12, wherein the safety indicator indicates that the sorted users are safe.

20. The computer-implemented method of claim 19, wherein the display further includes a detailed status of the safe sorted users indicating which user of the social networking system marked each sorted user safe.

21. The computer-implemented method of claim 20, wherein the detailed status of the safe sorted users is displayed or not displayed responsive to a privacy setting.

22. A non-transitory computer-readable storage medium comprising instructions that when executed on a processor cause the processor to perform steps of:
    establishing an emergency event node for an emergency in a social networking system;
    accessing records for a plurality of users of the social networking system, wherein each user of the plurality of users is associated with a set of connections to other users in the social networking system;
    determining a set of at-risk users from the plurality of users as being associated with the emergency event node, the set of at-risk users identifying users that may be impacted by the emergency;
    requesting a status update relative to the emergency event node from one or more users connected to at least one at-risk user in the set of at-risk users;
    receiving, from a user connected to an at-risk user in the set of at-risk users, one or more status updates about one or more at-risk users, the status update including a safety indicator chosen from a set of predetermined safety indicators; and
    communicating the status updates, including the safety indicator, about the at-risk user to one or more other users who have established a connection with the at-risk user, the communicating excluding communication of the status updates to one or more users who do not have access privileges to information associating the one or more at-risk users with the emergency event node.

23. A system comprising:
    the computer-readable storage medium of claim 22; and
    the processor.

24. A non-transitory computer-readable storage medium comprising instructions that when executed on a processor cause the processor to perform steps of:
    establishing an emergency event node in a social networking system;
    identifying a set of at-risk users relative to the emergency event node;
    associating a status with each of the users in the set of at-risk users who are associated with the emergency event node, the status including a safety indicator chosen from a set of predetermined safety indicators;
    providing an interface to a viewing user of the social networking system to view information associated with the emergency event node in the social networking system;
    excluding a connection from a plurality of viewing user's connections if the viewing user does not have access privileges to information associating the connection with the emergency event node;
    filtering the plurality of the viewing user's connections;
    sorting the filtered connections, the sorting based in part on the filtered connections' membership in the set of at-risk users; and
    sending, for display to the viewing user, information about at least a portion of the sorted users, the information including the status of the sorted users, wherein the information sent for display to the viewing user includes an interaction element to provide a selection of a safety indicator from the set of predetermined safety indicators.

25. A system comprising:
    the non-transitory computer-readable storage medium of claim 24; and
    the processor.

* * * * *

UNITED STATES PATENT AND TRADEMARK OFFICE
CERTIFICATE OF CORRECTION

PATENT NO. : 9,665,835 B2
APPLICATION NO. : 13/400012
DATED : May 30, 2017
INVENTOR(S) : Brian Paihan Sa et al.

It is certified that error appears in the above-identified patent and that said Letters Patent is hereby corrected as shown below:

In the Claims

Column 10, Line 3, after "newsfeed," delete "feed".

Column 10, Line 8-9, after "wherein," delete "the request to".

Signed and Sealed this
First Day of May, 2018

Andrei Iancu
*Director of the United States Patent and Trademark Office*